United States Patent [19]
Woon et al.

[11] Patent Number: 5,142,868
[45] Date of Patent: Sep. 1, 1992

[54] TURBOCOMPOUND ENGINE WITH POWER TURBINE BYPASS CONTROL

[75] Inventors: Peter V. Woon; Amarjit Ghuman; Rodoljub Radovanovic, all of Columbus, Ind.; Brian E. Walsham, Holmfirth; Steven C. Francis, Huddersfield, both of England

[73] Assignee: Cummins Engine Company, Inc., Columbus, Ind.

[21] Appl. No.: 620,210

[22] Filed: Nov. 30, 1990

[51] Int. Cl.⁵ .............................................. F02G 5/00
[52] U.S. Cl. ........................................ 60/624; 60/602
[58] Field of Search ............................ 60/624, 602

[56] References Cited

U.S. PATENT DOCUMENTS

| | | | |
|---|---|---|---|
| 3,096,614 | 7/1963 | Silver | 60/602 |
| 4,395,884 | 8/1983 | Price | 60/602 |
| 4,442,672 | 4/1984 | Fischer | 60/602 |
| 4,452,043 | 6/1984 | Wallace | 60/624 |
| 4,474,006 | 10/1984 | Price et al. | 60/602 |
| 4,476,682 | 10/1984 | McInerney | 60/602 |
| 4,703,625 | 11/1987 | Caldwell | 60/602 |
| 4,748,812 | 6/1988 | Okada et al. | 60/624 |
| 4,843,822 | 7/1989 | Okada | 60/624 |
| 4,858,440 | 8/1989 | Okada | 60/624 |
| 4,882,906 | 11/1989 | Sekiyama et al. | 60/624 |
| 4,897,998 | 2/1990 | Sekiyama | 60/624 |

FOREIGN PATENT DOCUMENTS 250662 10/1986 Japan .

Primary Examiner—Richard A. Bertsch
Assistant Examiner—Peter Korytnyk
Attorney, Agent, or Firm—Sixbey, Friedman, Leedom & Ferguson

[57] ABSTRACT

A turbocompound engine having a power turbine bypass valve and a control module for controlling opening and closing of the bypass valve. The control module opens the bypass valve for various operating conditions, such as at high altitudes, low speed/high load, and transient load conditions for improved engine operation.

8 Claims, 5 Drawing Sheets

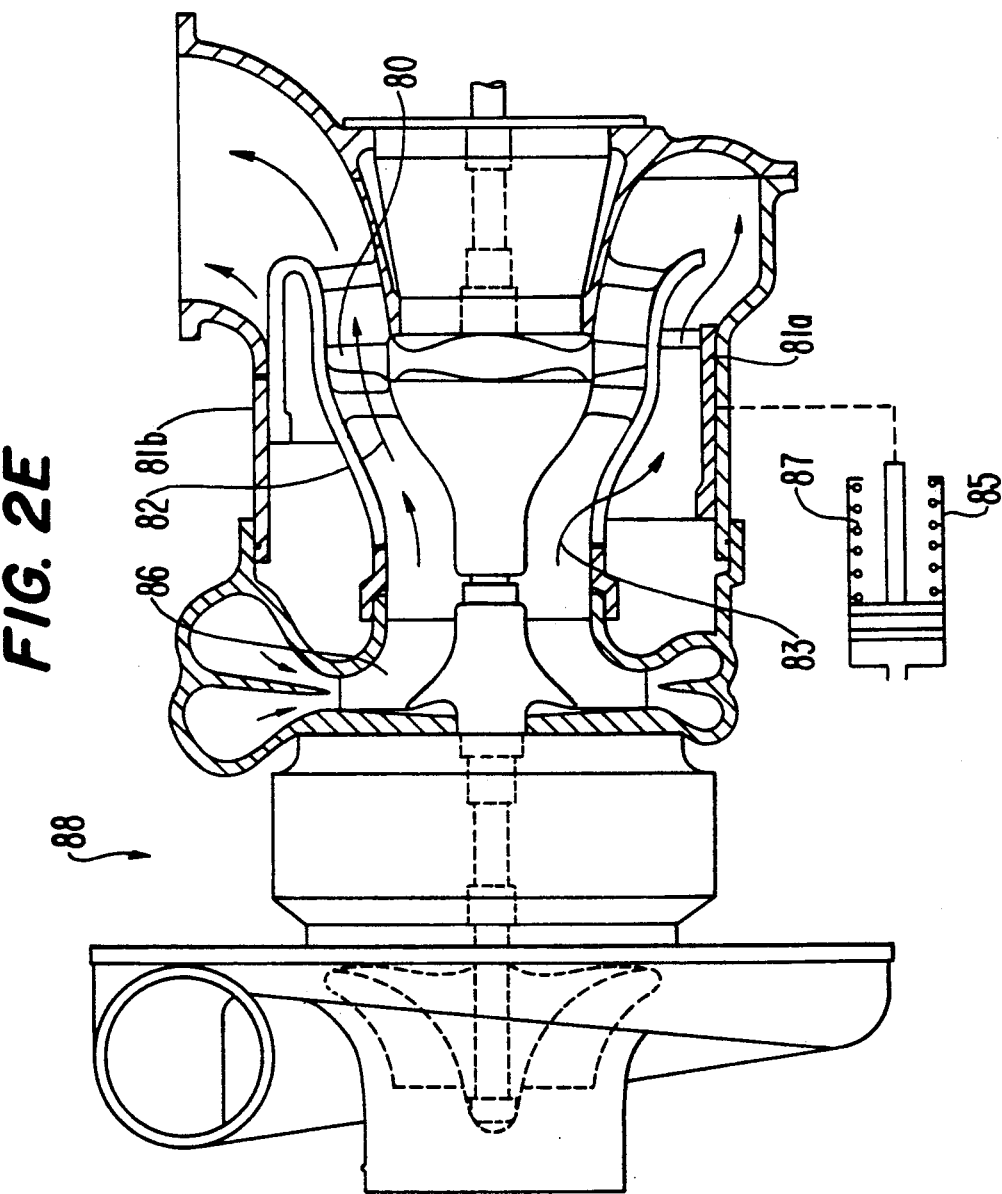

TURBOCOMPOUND ENGINE WITH POWER TURBINE BYPASS CONTROL

TECHNICAL FIELD

The invention relates to turbocompound engine, and more particularly to a power turbine bypass control for a turbocompound engine.

BACKGROUND OF THE INVENTION

A standard turbocompound engine includes a turbocharged diesel engine with a power turbine placed downstream of the turbine of the turbocharger. The power turbine recovers exhaust energy and transmits power to the engine output shaft, to which the turbine is coupled by a gear train.

While the power turbine is useful in providing additional output shaft power, it has been found that the power turbine restricts air flow to unacceptable levels under certain operating conditions, such as at high altitudes, during low speed/high load conditions and during transient load conditions. The insufficient air flow results in poor performance, high exhaust temperatures and increased smoke or particulate emissions.

Exhaust valving systems which attempt to provide more favorable exhaust pressures for various operating conditions are well known. For example, U.S. Pat. No. 4,391,098 to Koduge discloses a turbocompound engine in which first and second waste gates are provided to control the supercharging pressure and the pressure fed to an auxiliary (power) turbine. The waste gates include pressure sensitive valves which open when the pressure is sufficient to overcome the bias of a spring plus atmospheric pressure. In operation, the first waste gate is opened when the supercharging pressure reaches a predetermined level, and bypasses a portion of the engine exhaust past the turbocharger turbine to the auxiliary turbine. When the engine operates at high speed, high load, the second waste gate is opened bypassing at least a portion of the exhaust gases past the auxiliary turbine. However, such a valving system does not provide improved exhaust conditions for various engine operating conditions, for example, to provide a better turbocharger match at low speed/high load conditions or during transient load conditions. The Kosuge arrangement merely provides relief valves to relieve pressures above a predetermined limit.

Japanese Utility Model Laid Open No. 157,941/85 discloses a turbocompound engine in which a power turbine bypass is actuated in response to depression of the accelerator pedal. However, actuation of a bypass valve based upon accelerator pedal positioning alone is insufficient to provide satisfactory exhaust flow for various operating conditions such as high altitude, low speed/high load or transient load conditions.

U.S. Pat. Nos. 4,748,812 and 4,800,726 to Okada et al. disclose turbocompound engines in which the exhaust leading to the auxiliary turbine is blocked during exhaust braking and the auxiliary turbine is utilized as a compressor driven by the engine crankshaft. In this arrangement, the blockage of the exhaust results in high energy back pressure which acts as an engine brake force by increasing the pumping work of the engine. However, the patent is not concerned with providing improved exhaust system conditions during non-braking modes and Oakda does not provide improved exhaust flow for various operating conditions since it merely blocks the exhaust flow.

SUMMARY OF THE INVENTION

It is therefore an object of the present invention to overcome the shortcomings of the prior art by providing a turbocompound engine having an improved power turbine bypass valve control.

It is a further object of the invention to provide control means which open a power turbine bypass valve under various operating conditions such as at high altitude, low speed/high load and during transient load conditions. Under these conditions, the power turbine produces little or no positive work to the drive shaft, while the air mass flow is less than optimal since the power turbine undesirably increases the turbocharger turbine exit pressure (thus reducing the pressure ratio across the turbocharger turbine). A turbocompound engine generally utilizes a smaller turbocharger turbine than a standard turbocharged engine. The smaller turbocharger turbine has a smaller swallowing capacity which, increases the pressure at the inlet of the turbocharger turbine. While this has the ability to advantageously provide a larger pressure ratio across the turbine (compared to a standard turbocharged engine), the pressure ratio is decreased as a result of the increased turbocharger turbine exit pressure caused by the power turbine. Bypassing the power turbine relieves the turbocharger turbine back-pressure or exit pressure, thus increasing the pressure ratio and boost.

During engine operation at high altitudes, the intake manifold pressure is reduced since the ambient air is less dense. This results in poor airflow and high exhaust temperatures. During transient load and low speed/high load conditions, the air-fuel ratio is lower than desired and the airflow is insufficient for complete fuel burning. As a result, excessive particular matter is generated due to incomplete fuel burning. In accordance with the present invention, applicants have realized the advantage in opening a power turbine bypass under the above conditions.

The boost, and thus the air mass flow, is increased when the power turbine is bypassed. By controlling a power turbine bypass valve, higher power, better fuel consumption at low speeds, lower particulates during transients as well as other advantages are achieved.

The above as well as other objects and advantages are achieved by the present invention in which a turbocompound engine is provided with a power turbine bypass valve and a control module which opens the bypass valve during selected operating conditions. The control module produces a signal for opening the bypass valve for example during operation at high altitudes, low speed/high load and load transient conditions for improved engine operation. These as well as other objects and advantages of the invention will become apparent from a consideration of the following description read in conjunction with the drawing.

BRIEF DESCRIPTION OF THE DRAWINGS

FIGS. 2A–2E show various bypass valve arrangements for bypassing the power turbine in accordance with the present invention.

DESCRIPTION OF THE PREFERRED EMBODIMENT

Figure 1:
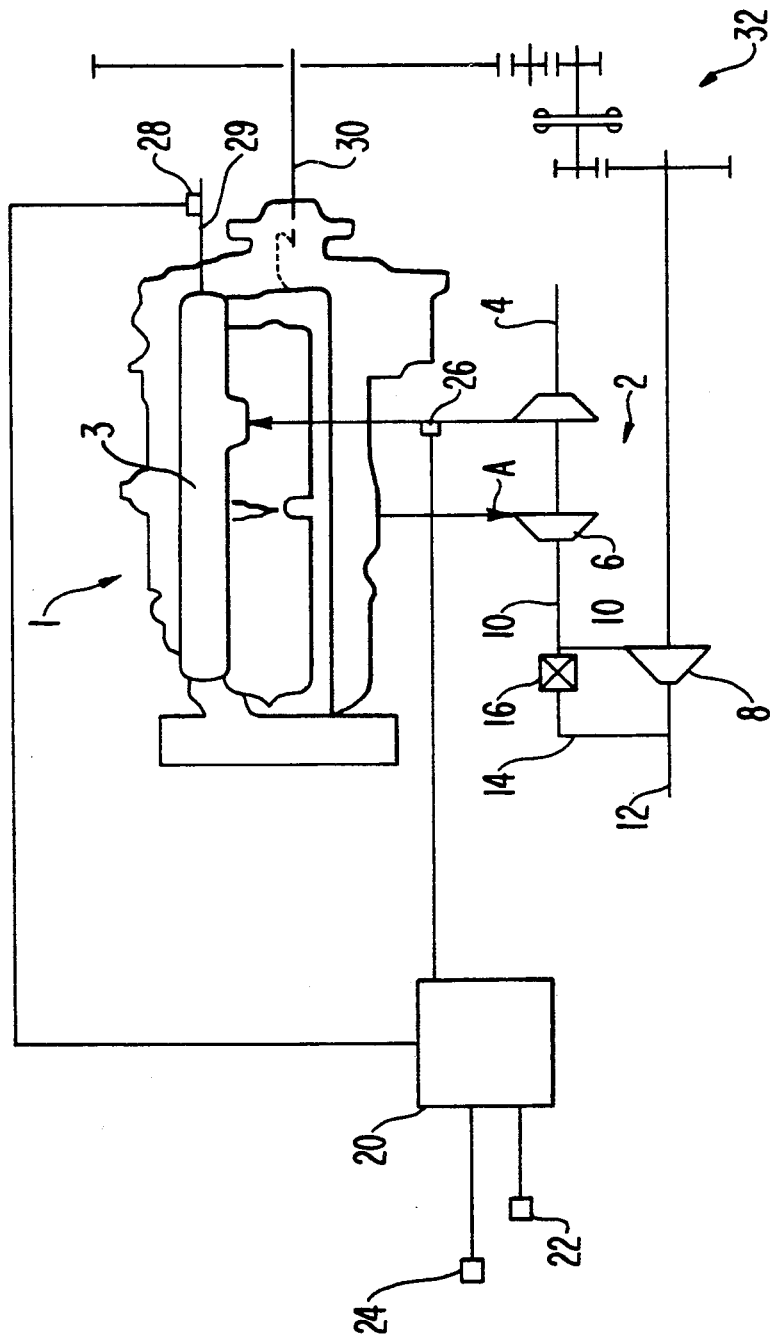
FIG. 1 is a schematic of a turbocompound engine having a controlled power turbine bypass valve.

FIG. 1 illustrates a turbocompound engine to which the present invention pertains. In a turbocompound engine, the turbocharger 2 receives ambient air from an inlet 4, and feeds compressed air to the engine through intake manifold 3. Exhaust from the engine, flowing in the direction shown by arrow A, drives a supercharger turbine 6. Downstream of the turbocharger turbine, a power turbine 8 extracts further energy from the exhaust flowing in interstage duct or passage 10. The power turbine is geared to the engine crankshaft 30 by gear train 32 to increase the engine output power. The exhaust then exits to the atmosphere via exhaust passage 12.

A bypass passage 14 is also provided connecting the interstage passage 10 and exit exhaust 12. Valve 16 is provided, such that when the valve is opened, exhaust gases proceed directly to exhaust passage 12, bypassing the power turbine. The valve 16 may be an on-off valve or may be of a variable opening type where it is desired to bypass only a portion of the exhaust gases.

Sensors 22, 24, 26 and 28 supply input information to the control module 20 for opening and closing the valve 16 during various operating conditions in which increased air mass flow is desired.

Applicants have realized the advantageous use of the bypass valve to improve various operating conditions of a turbocompound engine. At high altitudes, the work extraction of the power turbine is greater than desired, and the intake manifold pressure is reduced since the ambient air is less dense. This results in poor airflow and higher exhaust temperatures. In this condition, the control module opens the bypass valve based on information received from the engine speed sensor 22, throttle position sensor 24 and an absolute manifold intake pressure sensor 26. When the bypass valve is opened, the turbocharger back pressure is reduced, allowing more work to be done by the turbocharger turbine, resulting in higher air flow and lower exhaust temperatures. Higher power can also be achieved as a result of the increased air flow. It is to be understood that while high altitude conditions are determined by speed, throttle position and manifold pressure information, it is also possible to provide altitude information based on an ambient atmospheric pressure sensor.

For determining high altitude conditions, the control module stores absolute intake manifold pressures for various engine speed and throttle position values. The control module compares a sensed absolute manifold pressure with a stored value corresponding to the sensed speed and throttle position, and opens the bypass if the sensed absolute intake manifold pressure is below the stored value. It should be noted that absolute pressure measurements are required (rather than gauge pressure measurements which are generally suitable for determining other operating conditions) for the manifold pressure to provide meaningful data to the control module. Where the sensed absolute pressure is below a stored value corresponding to the sensed speed and throttle information, the bypass valve is opened.

When a conventional turbocompound engine is operating under transient load conditions (e.g., during acceleration), the air-fuel ratio is lower than desired. As a result, excessive particulate matter is generated due to incomplete fuel burning. Opening the bypass valve during a transient load condition increases the air flow and the boost (intake manifold) pressure which improves the air-fuel ratio and reduces particulates. Control module 20 determines whether the engine is in a transient load condition by comparing intake manifold pressures to stored values for a given throttle position and engine speed. If the intake manifold pressure sensed by sensor 26 is below a stored value, corresponding to the throttle position and engine speed sensed at 24 and 22, respectively), the control module opens the bypass valve 16.

A low speed/high load condition (for example, as a truck is climbing a hill) is determined by control module 20 from the engine speed and throttle position sensors 22,24. As in the transient load condition, during the low speed/high load condition when the power turbine is bypassed, the engine operates as a turbocharged engine with a small turbine casing, and achieves increased air flow over the standard turbocharged engine and over the base turbocompound engine. In a low speed, high load condition, the ability of the engine to burn fuel is restricted by the air mass flow. When the bypass is opened, higher airflow and the ability to burn more fuel is achieved, resulting in higher power in the low speed, high load condition.

A low speed/high load condition may also be determined by comparing a fuel flow rate, for a given engine speed, with a predetermined flow rate value. This is particularly useful where the fuel flow does not correspond solely to the throttle position as where the fuel flow is determined by an electronic or mechanical (fluidic) control system. For example, in an electronically controlled engine, the fuel flow rate may be controlled based upon the throttle position for a given engine speed (i.e., the electronic control generates a fuel flow rate signal based upon stored values for a given engine speed and throttle position). In addition, the fuel flow rate is sometimes limited by the boost pressure to prevent excessive fuel flow where the air mass flow is insufficient. The fuel flow rate can be determined either from the electronic signal which controls the fuel flow or from a fuel sensor such as a fuel pressure gauge since the fuel pressure is directly related to the fuel flow rate. Where the fuel flow rate is utilized in lieu of throttle position, the control module stores predetermined fuel flow values corresponding to various engine speeds. The control module compares the actual fuel flow rate with a stored value corresponding to the sensed engine speed, and opens the bypass if the actual flow rate exceeds the stored value, indicating the presence of a high load.

It is to be understood that the fuel flow rate may also be utilized as an indication of load in lieu of throttle position in the transient or high altitude determinations discussed above. For example, fuel flow sensor 28 may be utilized to indicate the flow rate in fuel line 29 as shown in FIG. 1. Particularly in the transient load determination, some engines are equipped with a fuel flow control which limits the fuel flow based on the boost pressure during transient loads to prevent excess fuel feed which can cause black smoke. The fuel flow control limits the flow rate until a predetermined boost pressure is attained at which time the throttle position or alternatively an electronic control (which as described above determines fuel flow based upon speed and throttle position information) governs the fuel flow. In such circumstances, the use of fuel flow information may be more indicative of engine load than throttle position.

In the above embodiment, the bypass valve may be an on-off, or variable type. However, particularly as in the case of altitude bypass, a variable opening valve is preferred to allow adjustment for various altitudes. Of course, even where a variable valve is used, the valve is fully opened under certain conditions, such as during compression braking. The use of a variable valve may also be advantageous where it is desired to pass a portion of the exhaust gas toward the power turbine, for example, to prevent overheating.

Figure 2A:
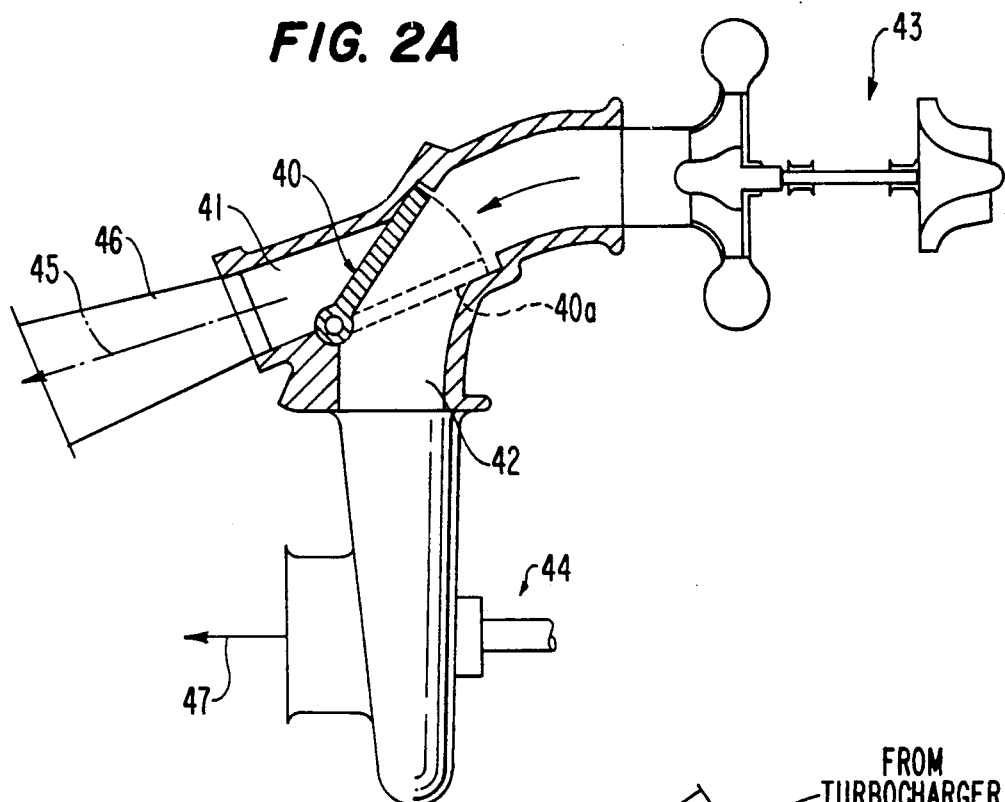
Figure 2B:
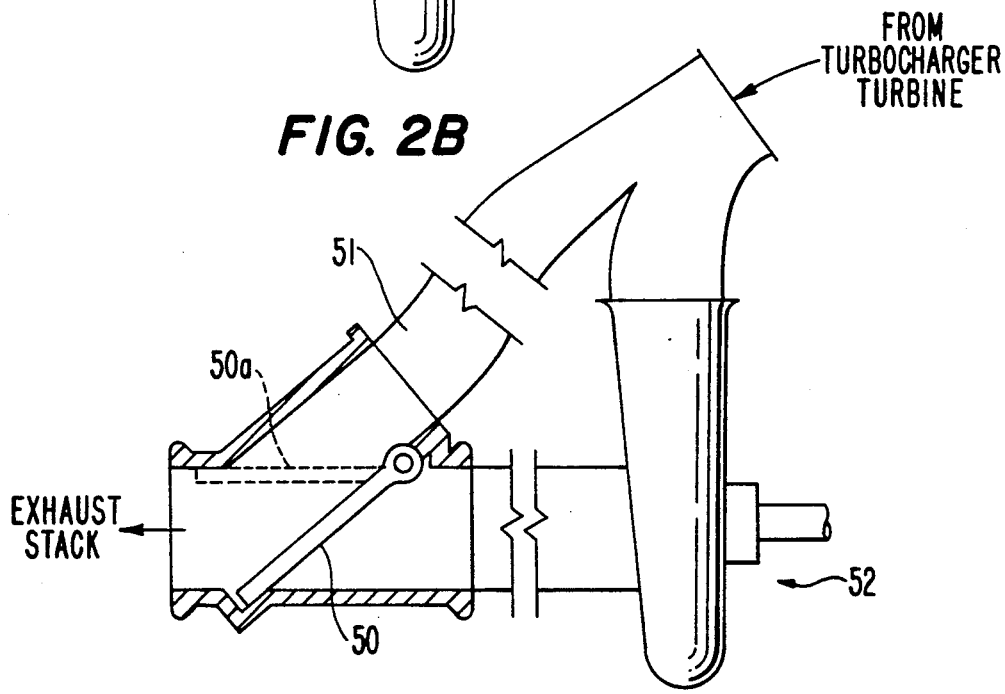

FIGS. 2A–E show examples of bypass valves that can be used to bypass the power turbine. It is to be understood that other bypass valve arrangements may also be utilized without departing from the scope of the present invention. FIGS. 2A–B illustrate respectively upstream and downstream flapper-type valves. In the upstream (FIG. 2A) arrangement, a gate or flapper 40 is provided at the junction of the bypass passage 41 and the passage 42 to the power turbine. The position illustrated represents the bypass closed position with the open position indicated by broken lines 40a. In the open position, exhaust gas from the turbocharger 43 is blocked from the power turbine 44 and passes to the exhaust stack as indicated at arrow 45. In the closed position, exhaust gas flows through the power turbine prior to exiting through the exhaust stack, as indicated at 47. Optionally, a diffuser 46 may be provided to further reduce the back pressure on the turbocharger turbine when the valve is in the open position.

FIG. 2B shows a downstream flapper arrangement in which flow through the power turbine is prevented by blocking the power turbine 52 outlet, as shown at 50 (bypass open). In the closed position 50a, the bypass duct is closed, causing the exhaust gas to flow through the power turbine.

Figure 2C:
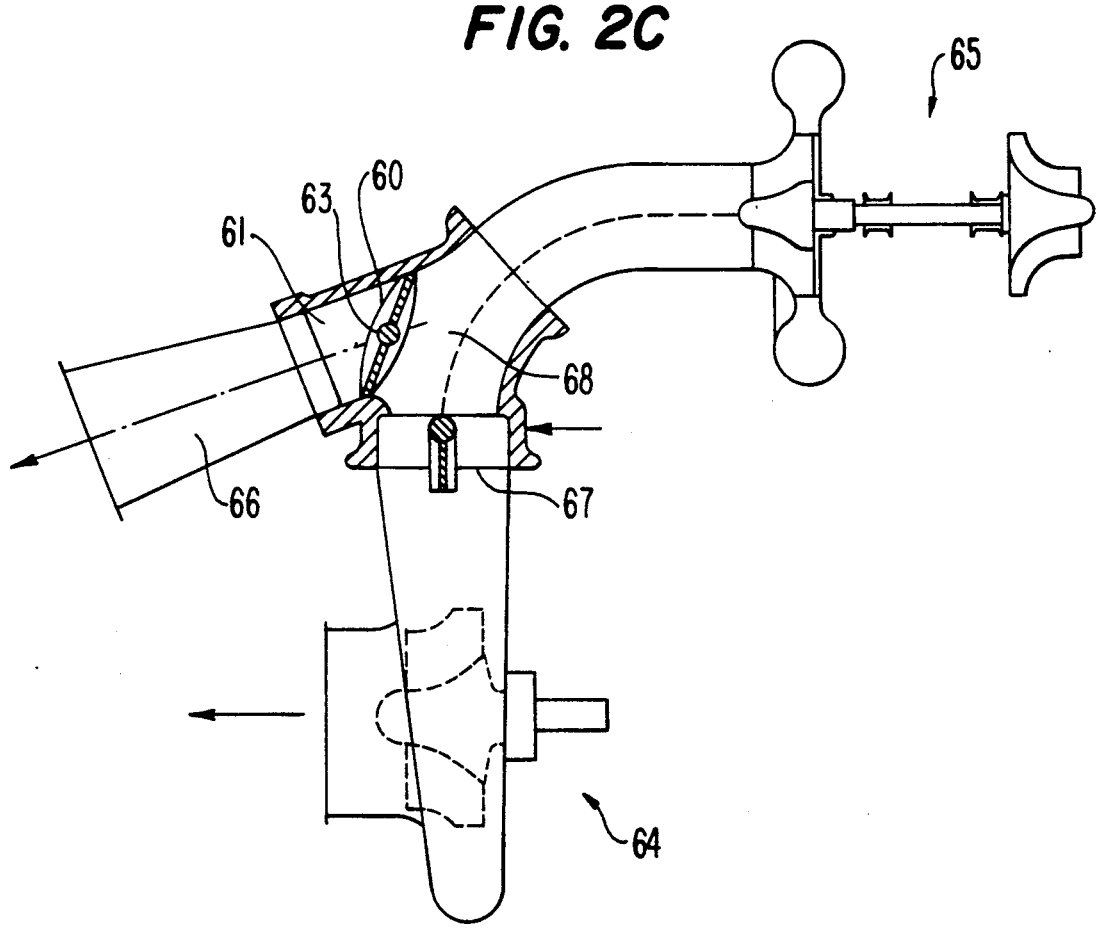

In FIG. 2C, a butterfly valve is provided in which diverter 60 blocks flow through the bypass duct when the valve is closed, and diverter 60 moves into the open position to allow flow through the bypass duct 61. In the open position, flow through the power turbine is not blocked; however, only a small amount of gas passed through the power turbine as the gas follows a path of least resistance and backpressure on the turbocharger turbine is relieved. An optional diffuser is shown at 66 to further improve flow through the bypass duct. In addition, an anti-backflow check valve 67 is provided at the power turbine inlet. The check valve prevents backflow which may result if the pressure at the power turbine inlet exceeds the pressure at the intersection 68, for example, just after the bypass has been opened.

Figure 2D:
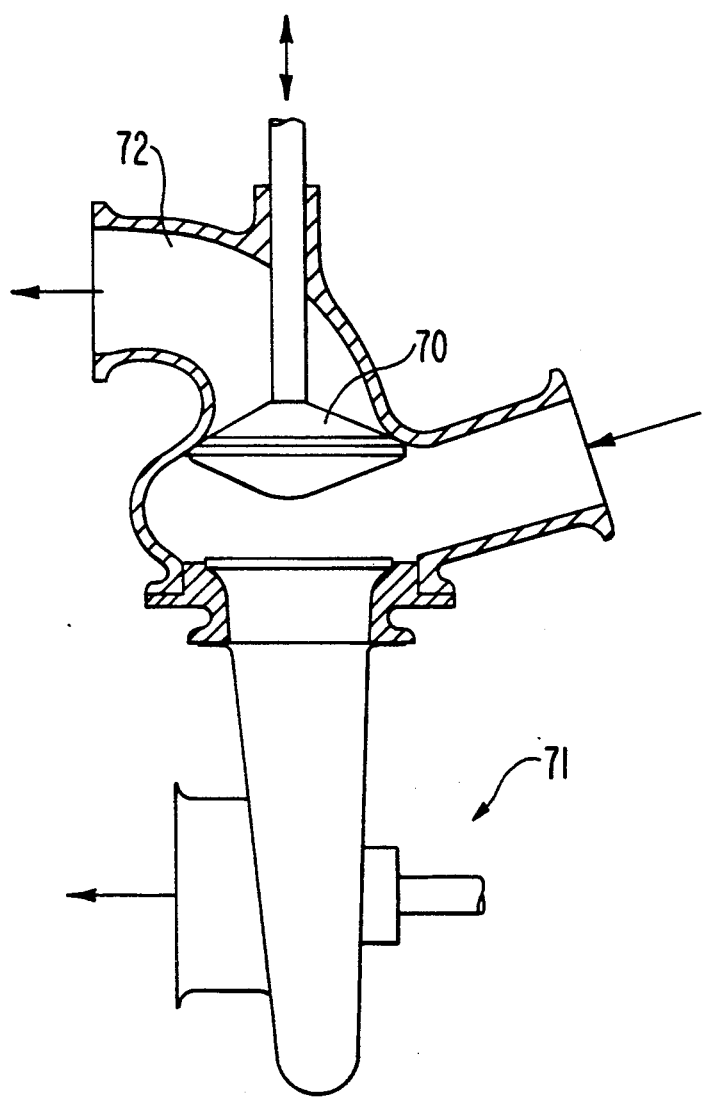

FIG. 2D shows a poppet valve in the bypass closed position. For the bypass open position, the valve 70 is actuated fluidically or by a spring to move downwardly and close the inlet to the power turbine while simultaneously opening the inlet to the bypass duct. As with the valves in FIG. 2A–C, the valve may be operated to a partially open position, so that a small portion of the exhaust gas passes through the power turbine. This is particularly useful where overheating of the power turbine is a problem.

FIG. 2E shows an axial power turbine 80 with a translating shroud bypass 81a, 81b. For illustrative purposes, the upper portion of the shroud is shown in the bypass closed position at 81b, while the lower portion of the shroud 81a is shown in the bypass open position. It is to be understood, however, that the entire shroud moves together as a unit between the open and closed positions. In the closed position 81b, all of the exhaust gas flows through the power turbine as indicated by arrows 82. In the open position 81a, most of the exhaust gas bypasses the power turbine as indicated by arrows 83. When it is desired to relieve backpressure on the turbocharger turbine 86, fluid cylinder 85 moves the shroud to the open position. The cylinder may be operated pneumatically (for example, by compressed air generated from the turbocharger 88) or hydraulically. Bias means are provided to return the shroud to the closed position in which all gas flows through the power turbine. It is understood that the cylinder may also be biased in the shroud bypass open position and fluidically actuated to move the shroud into the closed position.

Industrial Applicability

The bypass control, as described above, thus provides engine operation with better air flow for various operating modes or conditions resulting in improved power, lower operating temperatures, reduced smoke and particulates, and provides improved driveability due to increased engine response during transient or high altitude conditions.

What is claimed:

1. A turbocompound engine having a power turbine bypass control comprising:

an internal combustion engine having a crankshaft, an intake manifold and an exhaust manifold;

turbocharger means for converting exhaust gas energy into mechanical energy for boosting intake air pressure, said turbocharger means including a first turbine connected with said exhaust manifold;

power turbine means for converting energy remaining in exhaust gases exiting said first turbine into mechanical energy, said power turbine means coupled to the crankshaft of said engine;

exhaust passage means including a bypass valve wherein exhaust gas from said engine passes through said power turbine means when said bypass is in a closed position and at least some of the engine exhaust gas bypasses said power turbine means when said bypass valve is in an open position; and bypass control means for determining whether the engine is operating under a low speed/high load condition and for opening said bypass valve in response to a determination of a low speed/high load condition.

2. The turbocompound engine of claim 1, further including an engine speed sensor and a throttle position sensor;

said bypass control means includes stored throttle position values for corresponding engine speed values and determines a low speed/high load condition when the sensed throttle position exceeds the stored throttle position value corresponding to the sensed engine speed.

3. The turbocompound engine of claim 1, further including a fuel flow rate sensor, and an engine speed sensor;

said bypass control means includes stored values of fuel flow rate for corresponding values of engine speed, whereby a low speed/high load condition is determined to exist when the sensed fuel flow rate exceeds a stored value corresponding to a sensed engine speed.

4. A turbocompound engine having a power turbine bypass control comprising:

an internal combustion engine having a crankshaft, an intake manifold and an exhaust manifold;

turbocharger means for converting exhaust gas energy into mechanical energy for boosting intake air pressure, said turbocharger means including a first turbine connected with said exhaust manifold;

power turbine means for converting energy remaining in exhaust gases exiting said first turbine into mechanical energy, said power turbine means coupled to the crankshaft of said engine;

exhaust passage means including a bypass valve wherein exhaust gas from said engine passes through said power turbine means when said bypass is in ia closed position and at least some of the engine exhaust gas bypasses said power turbine means when said bypass valve is in an open position; and bypass control means for determining whether the engine is operating under a transient load condition and for opening said bypass valve in response to a determination of a transient load condition.

5. The turbocompound engine of claim 4, further including an engine speed sensor, an intake manifold pressure sensor and a throttle position sensor;

said sensors providing signals to said bypass control means, said bypass control means including stored pressure values for corresponding throttle position and engine speed values whereby a transient load condition is determined to exist when a sensed intake manifold pressure is below a stored value corresponding to sensed throttle position and engine speed values.

6. The turbocompound engine of claim 4, further including an engine speed sensor, a fuel flow rate sensor and an intake manifold pressure sensor:

said bypass control means includes stored pressure values corresponding to engine speed and fuel flow rate values, whereby a transient load condition is determined to exist when a sensed intake manifold pressure value is lower than a stored pressure value corresponding to sensed engine speed and fuel flow rate values.

7. A turbocompound engine having a power turbine bypass control comprising:

an internal combustion engine having a crankshaft, an intake manifold and an exhaust manifold;

turbocharger means for converting exhaust gas energy into mechanical energy for boosting intake air pressure, said turbocharger means including a first turbine connected with said exhaust manifold;

power turbine means for converting energy remaining in exhaust gases exiting said first turbine into mechanical energy, said power turbine means coupled to the crankshaft of said engine;

exhaust passage means including a bypass valve wherein exhaust gas from said engine passes through said power turbine means when said bypass is in a closed position and at least some of the engine exhaust gas bypasses said power turbine means when said bypass valve is in an open position;

bypass control means for determining whether the engine is operating at high altitudes and for opening said bypass valve in response to a high altitude determination.

8. The turbocompound engine of claim 7, further including an engine speed sensor, a throttle position sensor and an absolute intake manifold pressure sensor, each of said sensors providing signals to said control means;

said bypass control means determines the presence of a high altitude condition based upon said signals provided by said speed, throttle position and intake manifold pressure sensors.

* * * * *